(12) United States Patent
Takaara

(10) Patent No.: US 6,681,808 B2
(45) Date of Patent: Jan. 27, 2004

(54) FLEXIBLE TUBE FOR VACUUM SYSTEM

(75) Inventor: Eiji Takaara, Yamanashi (JP)

(73) Assignee: Oki Electric Industry Co, Ltd., Tokyo (JP)

(*) Notice: Subject to any disclaimer, the term of this patent is extended or adjusted under 35 U.S.C. 154(b) by 0 days.

(21) Appl. No.: 10/345,317

(22) Filed: Jan. 16, 2003

(65) Prior Publication Data
US 2003/0172980 A1 Sep. 18, 2003

Related U.S. Application Data (63) Continuation-in-part of application No. 10/095,445, filed on Mar. 13, 2002, now abandoned.

(51) Int. Cl.⁷ .................................................. F16L 11/00
(52) U.S. Cl. ........................ 138/121; 138/122; 138/177
(58) Field of Search ................................ 138/121, 122, 138/177, 178

(56) References Cited

U.S. PATENT DOCUMENTS

| | | | |
|---|---|---|---|
| 3,028,289 A | 6/1962 | Roberts et al. ......... 138/121 X |
| 4,147,185 A | 4/1979 | Hines ........................... 138/121 |
| 4,252,849 A | * 2/1981 | Nishimura et al. .......... 428/192 |
| 4,559,973 A | * 12/1985 | Hane et al. .................. 138/138 |
| 5,048,572 A | * 9/1991 | Levine ........................ 138/121 |
| 5,279,333 A | 1/1994 | Lawrence .................... 138/121 |
| 5,379,804 A | 1/1995 | Dunn et al. ................. 138/104 |
| 5,380,050 A | 1/1995 | Sanders et al. ......... 138/121 X |
| 5,413,147 A | 5/1995 | Moreiras et al. ............ 138/109 |
| 5,678,610 A | 10/1997 | Scarazzo et al. ............ 138/109 |
| 5,706,864 A | 1/1998 | Pfleger ........................ 138/121 |
| 5,848,618 A | 12/1998 | Guest ........................... 138/121 |
| 5,901,755 A | 5/1999 | Winter et al. ................ 138/121 |
| 6,216,742 B1 | 4/2001 | Masui et al. ................. 138/121 |
| 6,310,284 B1 | 10/2001 | Ikeda ....................... 138/121 X |

FOREIGN PATENT DOCUMENTS

| | | |
|---|---|---|
| JP | 09-273696 | 10/1997 |
| JP | 10-238689 | 9/1998 |

* cited by examiner

Primary Examiner—Patrick Brinson
(74) Attorney, Agent, or Firm—Rabin & Berdo, P.C.

(57) ABSTRACT

A flexible tube for a vacuum system includes a tube body and a cover. The tube body is made of hard material. The tube body has projected parts and depressed parts. The cover is provided over an outer surface of the tube body. The cover is made of elastic material. The cover may be in contact with the projected parts of the tube body and extend over the depressed parts of the tube body so that a vacant space is formed between the tube body and the cover.

20 Claims, 7 Drawing Sheets

FLEXIBLE TUBE FOR VACUUM SYSTEM

CROSS-REFERENCE TO RELATED APPLICATIONS

This application is a continuation-in-part of U.S. application Ser. No. 10/095,445, filed on Mar. 13, 2002 now abandoned, the subject matter of which is incorporated herein by reference.

BACKGROUND OF THE INVENTION

This invention relates generally to a flexible tube used for a vacuum system, in which vacuum equipment is connected via such a vacuum tube.

A flexible tube has been used for piping between two or more vacuum devices or equipment. A conventional flexible tube is made of thin sheet metal and is shaped to have an uneven surface with projected parts and depressed or concave parts. If a machine tool or some other hard parts hits the projected parts of a flexible tube, the projected parts of the tube would be deformed and/or broken; and as a result, a vacuum leak might occur. A flexible tube for a vacuum system is usually subjected to a large pressure difference between atmospheric pressure and vacuum pressure. Therefore, such a flexible tube may be deformed or broken due to the pressure difference between the interior and exterior. If a flexible tube is accidentally in contact with an electric wiring, a short circuit might occur and small holes would be formed in the flexible tube.

SUMMARY OF THE INVENTION

Accordingly, an object of the present invention is to provide a flexible tube, which is well protected from pressure difference and mechanical shock. Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentality and combinations particularly pointed out in the appended claims.

According to the present invention, a flexible tube for a vacuum system includes a tube body and a cover. The tube body is made of hard material. The tube body has projected parts and depressed parts. A cover is provided over an outer surface of the tube body. The cover is made of elastic material. The cover is in contact with around the projected parts of the tube body and formed over the depressed parts of the tube body so that a vacant space is formed between the tube body and the cover.

DETAILED DESCRIPTION OF THE PREFERRED EMBODIMENTS

In the following detailed description of the preferred embodiments, reference is made to the accompanying drawings which form a part hereto and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1:
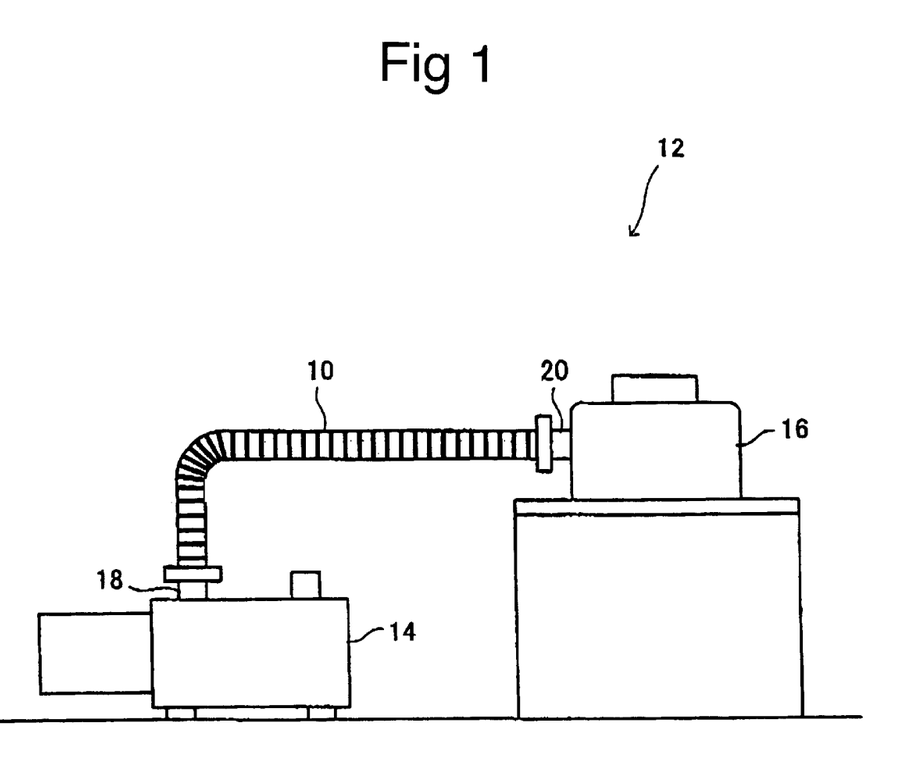
FIG. 1 is a schematic diagram illustrating a vacuum system in which a flexible tube according to the present invention is used.

FIG. 1 is a schematic diagram illustrating a vacuum system 12 in which a flexible tube according to the present invention is used. The vacuum system 12 includes a flexible tube 10; a vacuum pump 14 drawing vacuum; and a vacuum chamber 16, in which a vacuum state is to be maintained. The flexible tube 10 is arranged between the vacuum pump 14 and vacuum chamber 16. Both ends of the flexible tube 10 are connected to connecting ports 18 and 20, respectively.

Figure 2A:
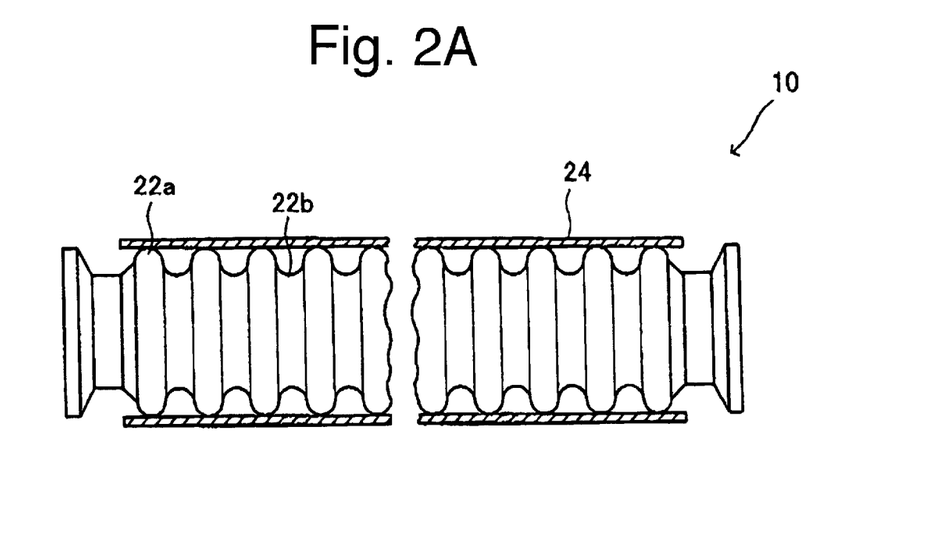
FIG. 2A is a cross-sectional view showing the structure of a flexible tube according to a first preferred embodiment of the present invention.
Figure 2B:
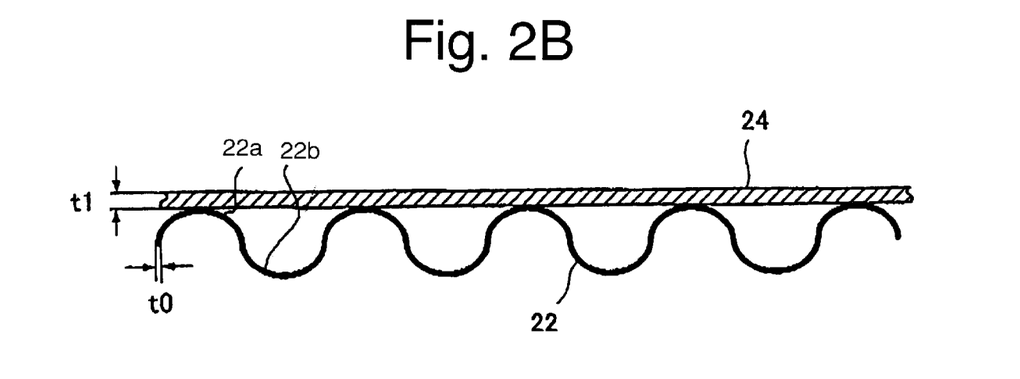
FIG. 2B is an enlarged cross-sectional view showing a part of the flexible tube shown in FIG. 2A.

FIG. 2A is a cross-sectional view showing the structure of the flexible tube 10 according to a first preferred embodiment of the present invention. FIG. 2B is an enlarged cross-sectional view showing a part of the flexible tube 10 shown in FIG. 2A.

Figure 3:
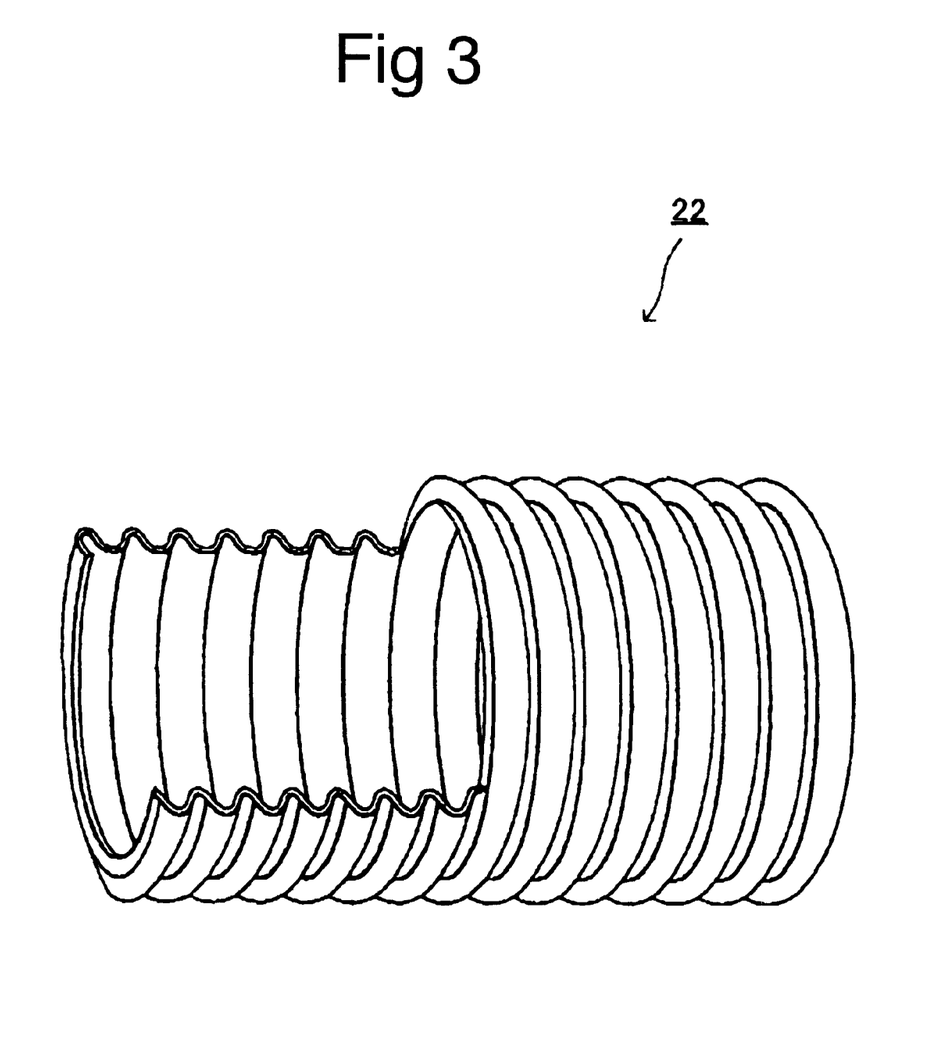
FIG. 3 is a perspective view illustrating a part of a tube body used for a flexible tube according to the present invention.

The flexible tube 10 includes a tube body 22, which is made of thin metal sheet, such as stainless steel; and an elastic cover 24. FIG. 3 is a perspective view illustrating a part of a tube body 22 used for the present invention. The tube body 22 includes projected parts 22a and depressed or concave parts 22b to obtain flexibility. The elastic cover 24 is provided over the outer surface of the tube body 22. The cover is made of elastic material, such as rubber, to have a thickness t1 of 1 mm. The tube body 22 is shaped to have a thickness t0 of 0.3 mm.

In fabrication, the tube body 22 is simply inserted into the cover 24. The cover 24 is shaped to be cylinder to have an inner surface, which is in contact with the projected parts 22a of the tube body 22 but not with the depressed parts 22b.

According to the first preferred embodiment, even if a machine tool or some other hard parts hits the flexible tube 10, the flexible tube 10 would not easily be deformed or broken. Further, the flexible tube 10 is not easily deformed or broken due to the pressure difference between interior and exterior of the tube 10. Further more, even if the flexible tube 10 is accidentally in contact with an electric wiring, a short circuit would not be made, because the tube body 22 is covered with the cover 24 having insulating characteristic.

Figure 4A:
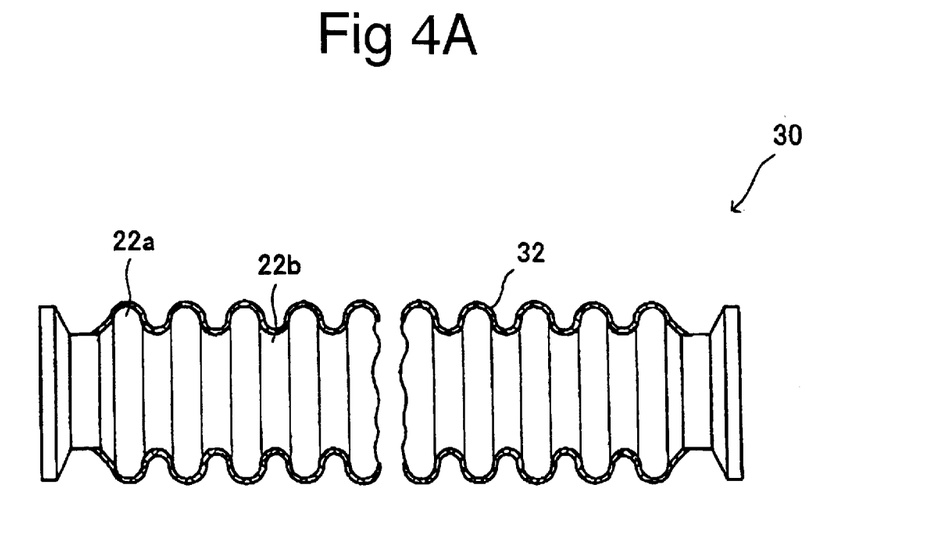
FIG. 4A is a cross-sectional view showing the structure of a flexible tube according to a second preferred embodiment of the present invention.
Figure 4B:
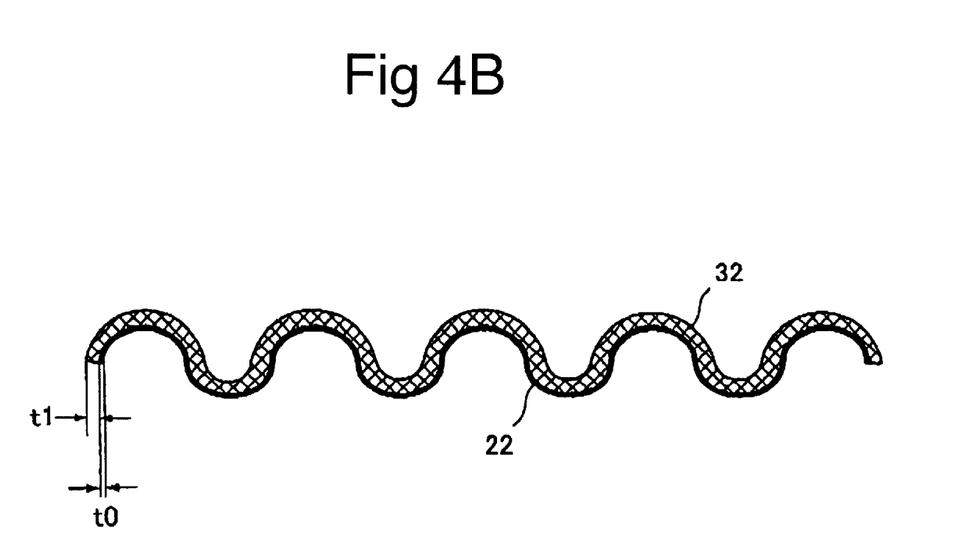
FIG. 4B is an enlarged cross-sectional view showing a part of the flexible tube shown in FIG. 4A.

FIG. 4A is a cross-sectional view showing the structure of a flexible tube 30 according to a second preferred embodiment of the present invention. FIG. 4B is an enlarged cross-sectional view showing a part of the flexible tube shown in FIG. 4A.

The flexible tube 30 is used for the vacuum system 12, shown in FIG. 1, in the same manner as the first preferred embodiment. In this embodiment, the same and corresponding elements to those in the first preferred embodiment are represented by the same reference numerals or symbols, and the same description is not repeated for avoiding redundancy.

The flexible tube 30 includes a tube body 22, which is made of thin metal sheet, such as stainless steel; and an elastic cover 32. The cover 32 is formed to be in contact with the whole surface of the tube body 22 including the projected parts 22a and depressed parts 22b. The cover 32 is made of elastic material, such as silicon, having heat shrinkability. The cover 32 is formed to have a thickness t1 of about 1–2 mm. The tube body 22 is shaped to have a thickness t0 of about 0.15–0.3 mm.

In fabrication, a cylindrical shape of the cover 32 having an inner diameter larger than an outer diameter of the tube body 22 is prepared. Next, the tube body 22 is inserted into the cover 32; and the cover 32 is heated uniformly so that the cover 32 is caused to shrink and be in contact with the whole outer surface of the tube body 22.

Figure 4C:
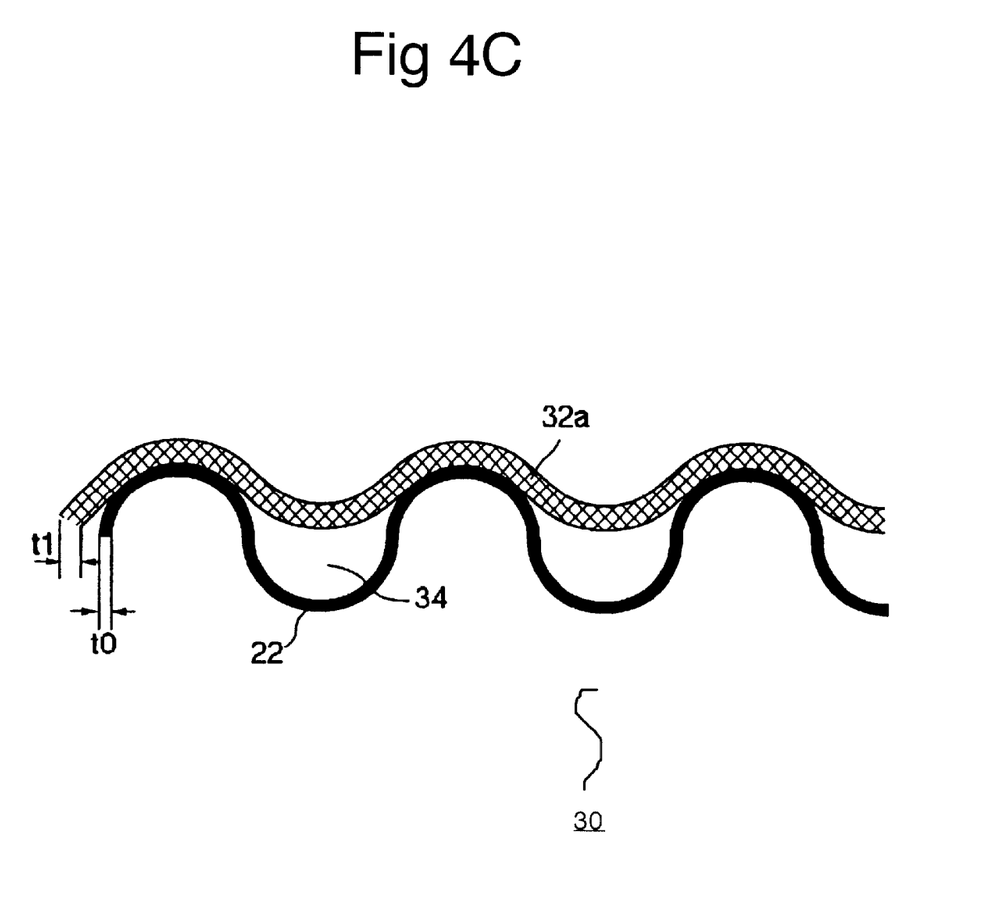
FIG. 4C is an enlarged cross-sectional view showing a part of the flexible tube according to a modified second preferred embodiment of the present invention.

FIG. 4C is an enlarged cross-sectional view showing a part of the flexible tube according to a modified second preferred embodiment of the present invention.

The flexible tube 30 includes a tube body 22, which is made of thin metal sheet, such as stainless steel; and an elastic cover 32a. The cover 32a is formed to be in contact with a part of the surface of the tube body 22 including a top portion of the projected parts 22a. Since the cover 32a is not in contact with the other portion of surface of the tube body 22 including the depressed parts 22b, there is a vacant space between the tube body 22 and the cover 32a. The cover 32a is made of elastic material, such as heat shrinkable silicone rubber or electron beam bridging soft flame resistance polyolefin resin, having heat shrinkability. The cover 32a is formed to have a thickness t1 of about 1–2 nun. The tube body 22 is shaped to have a thickness t0 of about 0.15–0.3 mm.

The fabrication of the flexible tube according to the modified second preferred embodiment is same to that of the second preferred embodiment. Therefore, the explanation is omitted.

According to the second preferred embodiment, even if a machine tool or some other hard parts hits the flexible tube 30, the flexible tube 30 would not easily be deformed or broken. Further, the flexible tube 30 is not easily deformed or broken due to the pressure difference between interior and exterior of the tube 30. Further more, even if the flexible tube 30 is accidentally in contact with an electric wiring, a short circuit would not be made, because the tube body 22 is covered with the cover 32 having insulating characteristic. Especially, according to the modified second preferred embodiment, flexibility of the tube is higher than that of the second preferred embodiment because the cover is in contact with only the top portion of the projected parts of the tube body. In the other word, non-contact portion of the cover enhances the flexibility of the tube.

Figure 5A:
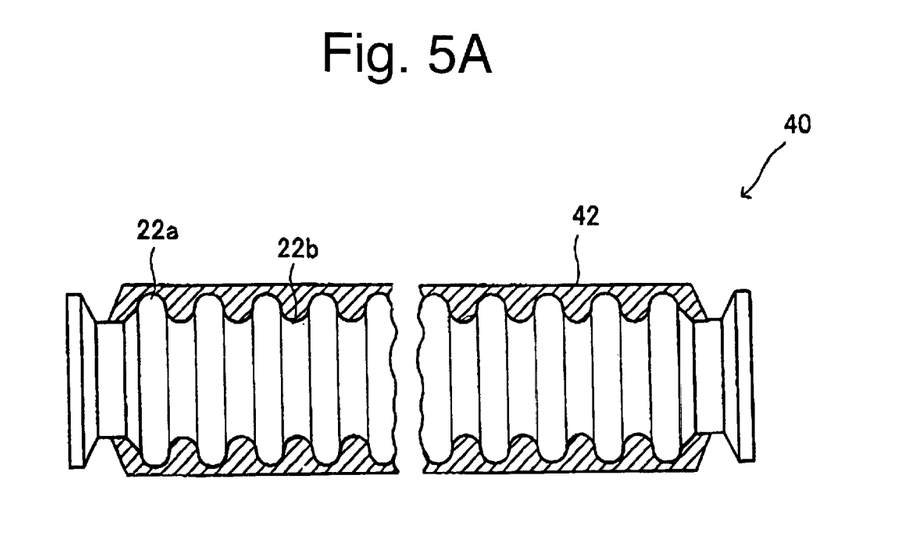
FIG. 5A is a cross-sectional view showing the structure of a flexible tube according to a third preferred embodiment of the present invention.
Figure 5B:
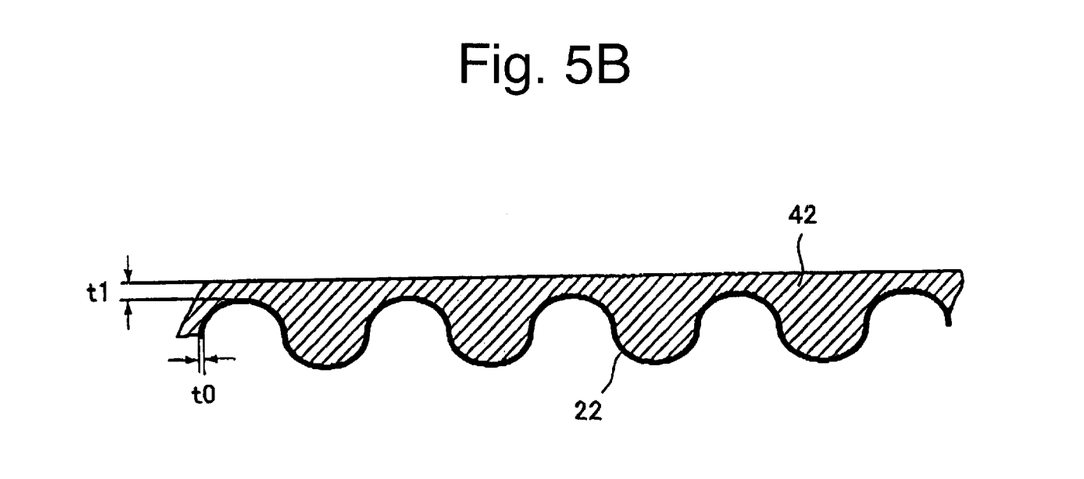
FIG. 5B is an enlarged cross-sectional view showing a part of the flexible tube shown in FIG. 5A.

FIG. 5A is a cross-sectional view showing the structure of a flexible tube 40 according to a third preferred embodiment of the present invention. FIG. 5B is an enlarged cross-sectional view showing a part of the flexible tube shown in FIG. 5A. The flexible tube 40 is used for the vacuum system 12, shown in FIG. 1, in the same manner as the first and second preferred embodiments. In this embodiment, the same and corresponding elements to those in the first and second preferred embodiments are represented by the same reference numerals or symbols, and the same description is not repeated for avoiding redundancy.

The flexible tube 40 includes a tube body 22, which is made of thin metal sheet, such as stainless steel; and an elastic cover 42. The elastic cover 42 is formed to be in contact with the whole surface of the tube body 22 including the projected parts 22a and depressed parts 22b. The cover 42 is made of elastic material, such as rubber. The tube body 22 is shaped to have a thickness t0 of about 0.15–0.3 mm. A thickness t1 of the cover 42 on the projected parts 22a is about 1–2 mm, as shown in FIG. 5B.

In fabrication, melted rubber is filled in the depressed parts 22b of the tube body 22 until the whole outer surface of the tube body 22 is completely covered with the rubber 42.

According to the third preferred embodiment, even if a machine tool or some other hard parts hits the flexible tube 40, the flexible tube 40 would not easily be deformed or broken. Further, the flexible tube 40 is not easily deformed or broken due to the pressure difference between interior and exterior of the tube 40. Further more, even if the flexible tube 40 is accidentally in contact with an electric wiring, a short circuit would not be made, because the tube body 22 is covered with the cover 42 having insulating characteristic.

Figure 6A:
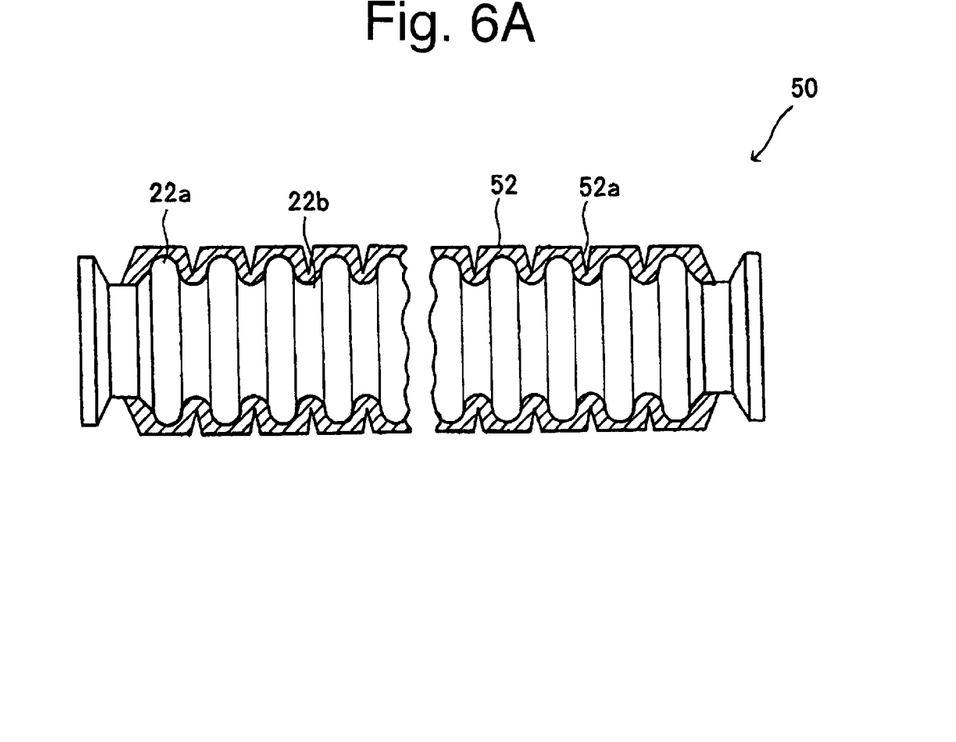
FIG. 6A is a cross-sectional view showing the structure of a flexible tube according to a fourth preferred embodiment of the present invention.
Figure 6B:
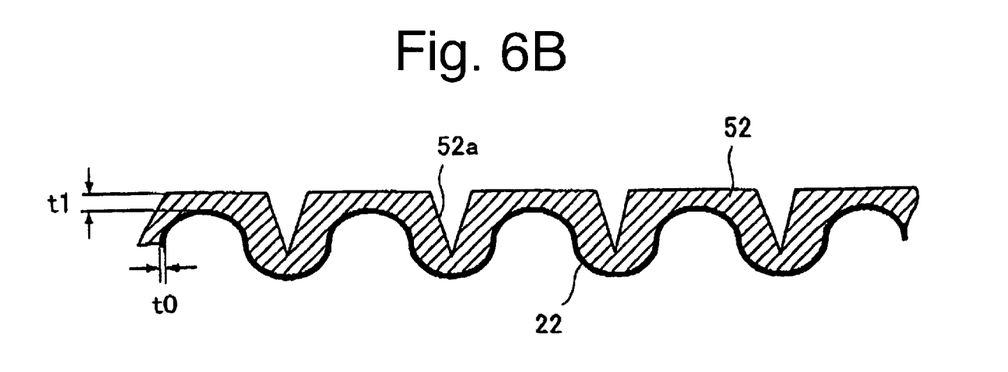
FIG. 6B is an enlarged cross-sectional view showing a part of the flexible tube shown in FIG. 6A.

FIG. 6A is a cross-sectional view showing the structure of a flexible tube 50 according to a fourth preferred embodiment of the present invention. FIG. 6B is an enlarged cross-sectional view showing a part of the flexible tube shown in FIG. 6A. The flexible tube 50 is used for the vacuum system 12, shown in FIG. 1, in the same manner, as the first to third preferred embodiments. In this embodiment, the same and corresponding elements to those in the first to third preferred embodiments are represented by the same reference numerals or symbols, and the same description is not repeated for avoiding redundancy.

The flexible tube 50 includes a tube body 22, which is made of thin metal sheet, such as stainless steel; and an elastic cover 52. The elastic cover 52 is formed to be in contact with the whole surface of the tube body 22 including the projected parts 22a and depressed parts 22b. The cover 52 is made of elastic material, such as rubber. The tube body 22 is shaped to have a thickness t0 of about 0.15–0.3 mm. A thickness ti of the cover 52 on the projected parts 22a is about 1–2 mm, as shown in FIG. 6B. The cover 52 is provided with V-shape slits 52a on the depressed parts 22b of the tube body 22. The V-shape slits 52a are formed not to reach the outer surface of the tube body 22 so that no portion is exposed.

In fabrication, melted rubber is filled in the depressed parts 22b of the tube body 22 until the whole outer surface of the tube body 22 is completely covered with the rubber 52. Next, the V-shape slits 52a are formed at portions on the projected parts 22a.

According to the fourth preferred embodiment, even if a machine tool or some other hard parts hits the flexible tube 50, the flexible tube 50 would not easily be deformed or broken. Further, the flexible tube 50 is not easily deformed or broken due to the pressure difference between interior and exterior of the tube 50. Further more, even if the flexible tube 50 is accidentally in contact with an electric wiring, a short circuit would not be made, because the tube body 22 is covered with the cover 52 having insulating characteristic.

In addition, according to the fourth preferred embodiment, the V-shape slits 52*a* are formed on the elastic cover 52, therefore, flexibility of the tube 50 is improved as compared to the third preferred embodiment. That is because, the radius of curvature becomes smaller.

What is claimed is:

1. A flexible tube for a vacuum system, comprising:
   a tube body made of hard material, the tube body having projected parts and depressed parts; and
   a cover provided over an outer surface of the tube body, the cover being made of elastic material, the cover being in contact with around the projected parts of the tube body and formed over the depressed parts of the tube body so that a vacant space is formed between the tube body and the cover,
   wherein the cover is made of a material selected from the group consisting of heat shrinkable silicone rubber and electron beam bridging soft flame resistance polyolefin resin.

2. A flexible tub e according to claim 1, wherein a thickness of the tube body is about 1–2 mm and a thickness of the cover i s about 0.15–0.3 mm.

3. A flexible tube according to claim 1, wherein the cover is made of heat shrinkable silicone rubber.

4. A flexible tube according to claim 1, wherein the cover is made of electron beam bridging soft flame resistance polyolefin resin.

5. A flexible tube according to claim 1, wherein the cover is shaped to be cylinder to have an inner surface which is in contact with the projected parts of the tube body but not with the depressed parts.

6. A flexible tube according to claim 1, wherein the cover is generally cylindrical in shape and is installed over the tube body by:
   inserting the tube body into the cover; and
   heating the cover in order to shrink the cover onto a part of the outer surface of the tube body.

7. A flexible tube according to claim 1, wherein the flexible tube is arranged between a vacuum chamber, in which a vacuum state is to be maintained, and a vacuum pump.

8. A flexible tube for a vacuum system, comprising:
   a tube body made of hard material, the tube body having projected parts and depressed parts; and
   a cover provided over an outer surface of the tube body, the cover being made of elastic material, wherein the cover is shaped to be in contact with the surface of the tube body around the projected parts thereof and not to be in contact with the surface of the tube body around at least part of the depressed parts thereof so that a vacant space is formed between the tube body and the cover,
   wherein the cover is made of a material selected from the group consisting of heat shrinkable silicone rubber and electron beam bridging soft flame resistance polyolefin resin.

9. A flexible tube according to claim 8, wherein a thickness of the tube body is about 1–2 mm and a thickness of the cover is about 0.15–0.3 mm.

10. A flexible tube according to claim 8, wherein the cover is made of heat shrinkable silicone rubber.

11. A flexible tube according to claim 8, wherein the cover is made of electron beam bridging soft flame resistance polyolefin resin.

12. A flexible tube according to claim 8, wherein the cover is generally cylindrical in shape and is installed over the tube body by:
    inserting the tube body into the cover; and
    heating the cover in order to shrink the cover onto at least a portion of the outer surface of the tube body.

13. A flexible tube according to claim 8, wherein the flexible tube is arranged between a vacuum chamber, in which a vacuum state is to be maintained, and a vacuum pump.

14. A flexible tube for a vacuum system, comprising:
    a tube body made of hard material, the tube body having projected parts and depressed parts; and
    a cover provided over an outer surface of the tube body, the cover being made of elastic material and being formed by filling silicon over the whole outer surface of the tube body,
    wherein the cover is provided with V-shape slits at the depressed parts of the tube body,and
    wherein the tube body has a thickness of about 1–2 mm and the cover has a thickness of about 0.15–0.3 mm.

15. A flexible tube according to claim 14, wherein the V-shape slits do not reach the outer surface of the tube body.

16. A flexible tube according to claim 14, wherein the flexible tube is arranged between a vacuum chamber, in which a vacuum state is to be maintained, and a vacuum pump.

17. A flexible tube according to claim 14, wherein the cover is made of heat shrinkable silicone rubber.

18. A flexible tube according to claim 14, wherein the cover is made of electron beam bridging soft flame resistance polyolefin resin.

19. A flexible tube for a vacuum system, comprising:
    a tube body made of hard material, the tube body having projected parts and depressed parts; and
    a cover provided over an outer surface of the tube body, the cover being made of elastic material and being formed by filling silicone over the whole outer surface of the tube body,
    wherein the cover is provided with V-shape slits on the depressed parts of the tube body, and
    wherein the cover is made of a material selected from a group consisting of heat shrinkable silicone rubber and electron beam bridging soft flame resistance polyolefin resin.

20. A flexible tube according to claim 19, wherein the V-shape slits do not reach the outer surface of the tube body.

* * * * *